United States Patent
Oana

(10) Patent No.: US 7,195,095 B2
(45) Date of Patent: *Mar. 27, 2007

(54) FLOATING PRNDL FACE PLATE ASSEMBLY AND METHOD TO ACCOMMODATE FLOOR BUILD VARIATIONS

(75) Inventor: Adrian Oana, Windsor (CA)

(73) Assignee: General Motors Corporation, Detroit, MI (US)

( * ) Notice: Subject to any disclaimer, the term of this patent is extended or adjusted under 35 U.S.C. 154(b) by 440 days.

This patent is subject to a terminal disclaimer.

(21) Appl. No.: 10/788,929

(22) Filed: Feb. 27, 2004

(65) Prior Publication Data

US 2005/0189160 A1    Sep. 1, 2005

(51) Int. Cl.
*B60K 26/00* (2006.01)

(52) U.S. Cl. .......................... 180/315; 180/90; 296/70; 296/37.8

(58) Field of Classification Search ................ 180/315, 180/90; 296/70, 37.8
See application file for complete search history.

(56) References Cited

U.S. PATENT DOCUMENTS

| | | | |
|---|---|---|---|
| 4,566,349 A * | 1/1986 | Van der Loon et al. . | 74/473.36 |
| 4,580,647 A | 4/1986 | Peifer et al. .................. | 180/78 |
| 4,589,639 A | 5/1986 | Peifer et al. ................ | 267/150 |
| 4,682,787 A | 7/1987 | Ruhter et al. ............... | 280/775 |
| 5,064,974 A | 11/1991 | Vigneau et al. .......... | 200/61.62 |
| 5,106,143 A * | 4/1992 | Soeters ....................... | 296/37.8 |
| 5,732,994 A | 3/1998 | Stancu et al. .............. | 296/37.8 |
| 5,848,855 A * | 12/1998 | Roossien .................... | 403/329 |
| 5,855,182 A * | 1/1999 | Kline et al. ................ | 116/28.1 |
| 5,865,066 A * | 2/1999 | Osborn et al. ............. | 74/502.4 |
| 5,887,485 A * | 3/1999 | VanOrder et al. ......... | 74/473.15 |
| 6,318,925 B1 * | 11/2001 | Bowers et al. .............. | 403/325 |
| 6,694,590 B1 * | 2/2004 | Jenkins ........................ | 29/423 |
| 6,843,521 B1 * | 1/2005 | Oana ........................... | 296/70 |
| 7,028,574 B1 * | 4/2006 | Bell et al. ................. | 74/473.15 |

FOREIGN PATENT DOCUMENTS

JP      EP09086347 A2 *   4/1999

* cited by examiner

*Primary Examiner*—David R. Dunn
*Assistant Examiner*—Leonard McCreary, Jr.
(74) *Attorney, Agent, or Firm*—Laura C. Hargitt

(57) ABSTRACT

A shifter face plate assembly and method for an automatic transmission having a shifter rod in an opening of a floor console which includes an intermediary plate and top face plate. The intermediary plate supports the top plate and floats horizontally laterally to obtain the proper sidewise position of the top plate with respect to the console opening. The top plate floats horizontally longitudinally to obtain the proper lengthwise position of the top plate with respect to the console opening. An eccentric cone on the shifter rod is movable to accommodate any offset of the shifter rod relative to its slot in the top plate after the proper position of the top plate in the console opening is obtained.

7 Claims, 3 Drawing Sheets

FLOATING PRNDL FACE PLATE ASSEMBLY AND METHOD TO ACCOMMODATE FLOOR BUILD VARIATIONS

TECHNICAL FIELD

This invention relates to an adjustable shifter face plate assembly for use with the flow-through instrument panel and console interface of a vehicle to accommodate floor build variations in vehicle assembly.

BACKGROUND OF THE INVENTION

In the prior art, engineering faces a continuing challenge to achieve design goals when seeking a "flow-through" (i.e., the appearance of uninterrupted connection) between the instrument panel and the floor console. The mass assembly of vehicles may create build variations that complicate this design goal. Attempts to achieve a smooth flow-through between instrument panel and floor console under some circumstances may have resulted in uneven gaps between fixed portions of the instrument panel, particularly at the driver's knee bolster and the glove box. Such overhangs or shingling at these locations make it difficult to achieve high quality fits and a world class modern look. The problem is made more difficult when the designer seeks a reduction in the number of floor console parts and a shifter assembly which is adjustable with respect to a floor console opening.

As a result of such floor build variations, the automatic shifter face plate (PRNDL) may not align perfectly with a console opening to achieve the world class look that is desired and gap-hiding gaskets may be required. Thus, there is also a need in the prior art to improve the shifter face plate assembly so that floor build variations can be accommodated without adding gaskets and while still achieving a smooth flow-through between the instrument panel and the floor console.

Achieving these results by reducing the build variations results in high costs. Also, splitting the console base into several parts along the vehicle floor with the interface of the parts hidden by the seats results in an increase in the number of parts.

SUMMARY OF THE INVENTION

This invention relates to an improved adjustable shifter face plate assembly which accommodates variations in floor console location when the floor console is mounted on a vehicle floor which has been subject to build variations during assembly. A shifter rod assembly projecting through an opening in such floor consoles may be offset or nearer one side of the opening than the other side of the opening. This creates uneven gaps between the shifter rod assembly and a side of the opening. The shifter plate assembly of this invention is shiftable within the console opening to even the gaps so that an aesthetically pleasing appearance is achieved. There is no need for supplementary rings or gaskets to mask the gaps or accommodate the offset. This results in a less shape-restrained space for the adjustable shifter face plate, and allows more styling freedom. It gives a high quality fit and a world class modern look.

The improved adjustable shifter face plate assembly permits the top or face plate to float horizontally. This accommodates the floor build variations. There is an intermediary plate which carries indicia such as the shifter position marks (PRNDL) and can move with respect to the shifter rod and a top plate. The intermediary plate also has an anti-rattle feature. The top plate can move or float longitudinally with respect to the intermediary plate and has a transparent window to show the indicia or shifter position marks (PRNDL). An eccentric cone is incorporated on the shifter rod shaft. The cone can be pushed down on the shifter rod after the intermediary plate has found the right position on the shifter rod support and the shifter base in the floor console. The cone is then rotated to accommodate the resulting offset of the shifter rod relative to the top plate slot in which the shifter rod moves. The eccentricity of the cone is used to accommodate any lateral shift in the parts and is rotatable on the shifter rod so that a world class look is achieved.

The adjustable shifter face plate assembly of this invention includes a shifter rod, a top plate horizontally floatable longitudinally with respect to the shifter rod projecting from an opening in the floor console, an intermediary plate between the shifter rod support and the top plate and horizontally floatable transversely with respect to the opening in the floor console to permit the intermediary plate and the top plate to move sufficiently so that the top plate aesthetically fits within the opening in the console. Finally, an eccentric cone is positionable on the shifter rod to align the shifter rod aesthetically with respect to the opening slot in the top plate through which the shifter rod projects.

A further object of this invention is to add an adjustable shifter face plate assembly in an opening of the floor console of the unitary structure to accommodate the variations between instrument panel and the floor of a vehicle being assembled. The assembly includes a shifter rod support which is adapted to be fixed with respect to the floor. It also includes a shifter rod projecting upwardly from the shifter rod support. It includes a top plate horizontally floatable longitudinally with respect to the opening of the console to orient the top plate of the shifter face plate assembly within the console opening. The assembly includes an intermediary plate between the shifter rod support and the top plate. The intermediary plate is horizontally floatable laterally or transversely with respect to the opening of the console to orient the shifter face plate assembly with respect to the console opening. And finally, an eccentric cone is positionable on the shifter rod and is sufficiently slidably and rotatably moveable with respect to the shifter rod so that any resulting offset of the top plate and intermediary plate with respect to the console opening is accommodated.

It is also an object of this invention to provide a method of adjusting a shifter face plate assembly to the console opening with another method which includes forming the instrument panel into two relatively pivotable portions to accommodate floor build variations in vehicle assembly and including the floor console as part of one portion. The other method includes spacing said instrument panel from the vehicle floor followed by sufficiently pivoting the one portion and floor console with respect to the other portion until the one portion and floor console engage the vehicle floor to accommodate floor build variations in vehicle assembly. This engagement accommodates any variation in the vehicle floor which exists between the instrument panel and the vehicle floor. The top plate of the shifter face plate assembly can then be aesthetically fitted within the console opening. Thus, two methods cooperate in achieving the world class look.

Another object of this invention is a shifter face plate assembly for the shifter rod of an automatic transmission. The assembly includes a top plate with a slot through which the shifter rod projects and a window. The assembly also includes an intermediary plate having shift indicia beneath the window of the top plate. In the assembly, the intermediary plate is floatable horizontally with respect to the console opening and longitudinally with respect to the top plate to position the indicia beneath the window of the top plate and to facilitate the proper orientation and movement of the top plate with respect to the floor console opening within which the top plate is moveable.

A further object of this invention is an adjustable shifter face plate assembly to accommodate the variations between the shifter face plate assembly and the floor console of a vehicle being assembled. The assembly includes a shifter rod base which is adapted to be fixed with respect to the floor. It also includes a shifter rod projecting upwardly from a shifter rod support on the shifter rod base. It also includes a top plate movable or horizontally floatable longitudinally with respect to the shifter rod support and has a window and a slot. The slot provides a passageway for the upwardly projecting and longitudinally movable shifter rod. And finally the assembly includes an intermediary plate between the shifter rod support and the top plate and has a slot alignable with the slot on the top plate to complete the passageway for the upwardly projecting and longitudinally shiftable rod. An indicia on the intermediary plate is aligned with the window in the top plate and is shiftable longitudinally with respect to the top plate. The intermediary plate also includes a slot oriented and configured sufficiently with respect to the shifter rod support to permit the intermediary plate to move or horizontally float sufficiently transversely so that the top plate is in a position aligned with the opening in the floor console through which the shifter rod projects. And finally, an eccentric cone is positioned on the shifter rod and is sufficiently slidably and rotatably moveable with respect to the slot in the top plate so that the shifter face plate assembly is aesthetically within the opening in the floor console to achieve a world class look where the floor console interfaces with the instrument panel.

This invention is also a method of adjusting a shifter face plate assembly to the shifter rod support in the opening of a floor console on a vehicle floor subject to floor build variations. The invention comprises affixing a shifter rod support to the vehicle floor with the shifter rod projecting upwardly, installing a top plate and an intermediary plate on the shifter rod, and laterally shifting the intermediary plate with respect to the shifter rod support and longitudinally shifting the top plate with respect to the intermediary plate to orient the plates with respect to the floor console opening.

The above features and other features and advantages of the present invention are readily apparent from the following detailed description of the best mode for carrying out the invention when taken in connection with the accompanying drawings.

DESCRIPTION OF THE PREFERRED EMBODIMENTS

Figure 1:
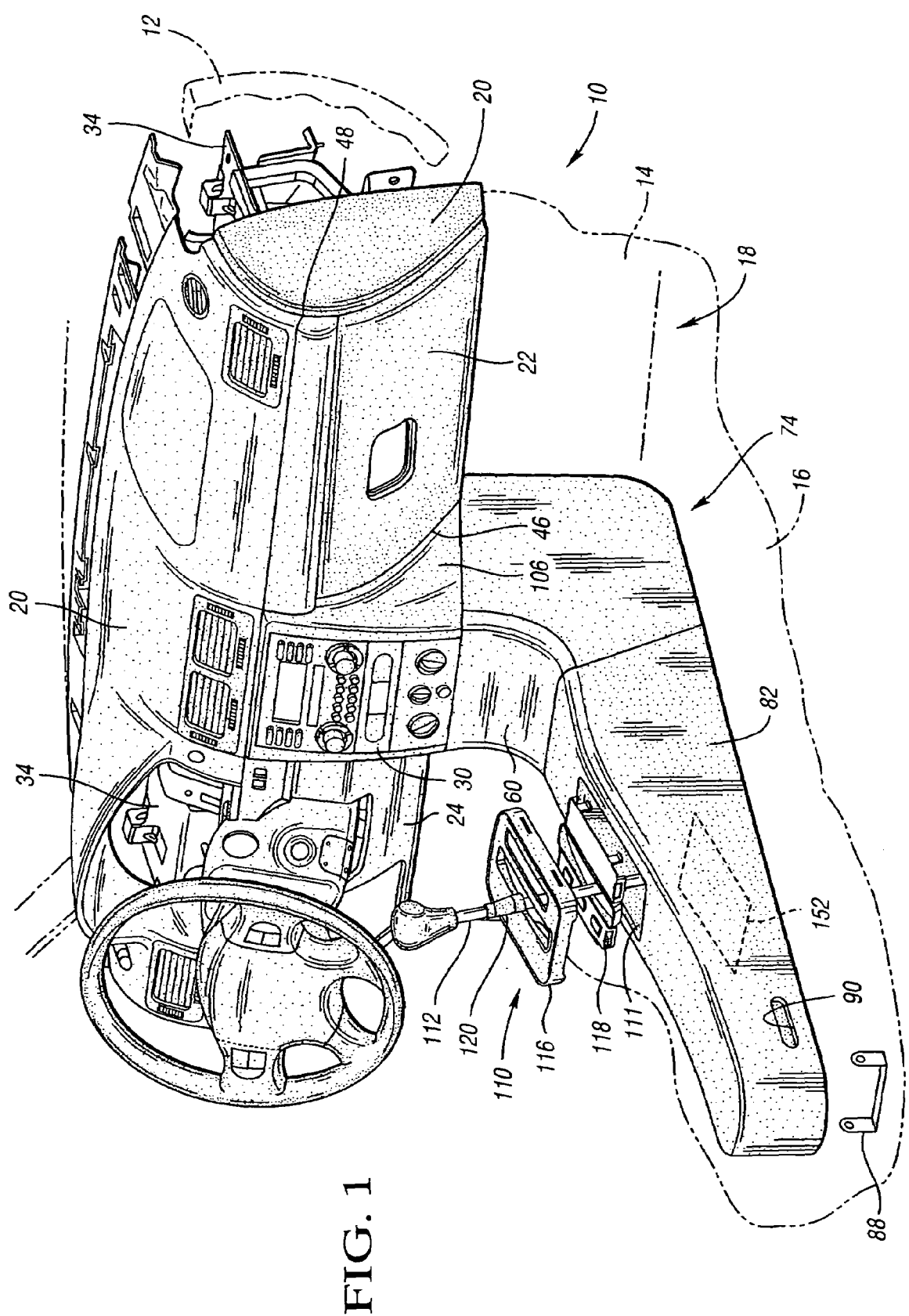
FIG. 1 is a fragmentary perspective view of an adjustable instrument panel and control console in a vehicle with a schematic exploded view of an adjustable shifter face plate assembly.

This is an invention to improve the fit and appearance or look of an instrument panel and console in an automotive vehicle built by mass assembly. With reference to FIG. 1, the vehicle 10 includes a structural frame 12, a front wall 14, and a floor 16. During mass production, the orientation of the frame 12 and the vehicle floor 16 may vary slightly between the multiple vehicles being assembled. A passenger compartment 18 in such vehicles is defined by front wall 14 and floor 16. Across the front of the passenger compartment is a vehicle instrument panel (IP) 20. The instrument panel 20 includes a glove box panel or door 22 and a driver's side knee bolster panel 24. A vehicle option package 30 normally rests between the glove box panel and the knee bolster panel.

The instrument panel 20 includes an instrument panel beam 34 having ends which connect to the frame 12 on opposite sides of the vehicle. The beam extends transversely across the front of the passenger compartment 18.

The instrument panel beam 34 is transverse and horizontal to the vertical side edge 46 of the glove box panel. A similar inboard side edge (concealed) exists along the inboard side of the driver's side knee bolster 24. A central stack modular structure 60 is horizontally pivotable on the instrument panel beam 34 and with respect to the inboard side edges 46 of the glove box panel 22 and the driver's side knee bolster 24. The pivot axis should be as close as possible behind a feature line 48 which is part of the design theme shown in FIG. 1. This arrangement is the subject of another concurrently filed application GP-303891 (GM0451PUS) entitled "Pivoting Instrument Panel Central Stack Structure and Method for Flow-Through Instrument Panel Console Interface" and is incorporated herein in its entirety.

The central stack modular structure 60 defines a vehicle option package 30 as a space into which one or more of a plurality of options can be placed. Such options may include a radio, CD and/or various air conditioning control knobs. These knobs extend into the passenger compartment from controls which are at least partially contained within the options package 30.

A floor console 82, including a floor console opening 111, extends longitudinally along the floor 16 of the vehicle. The rearward end 76 of the console 82 is tiltable downwardly for connection to a bracket 88 on the floor 16 of the vehicle. In general, the floor console 82 and the central stack modular structure 60 are two portions of a pivotable unitary structure 74 designed to provide an improved flow-through instrument panel/console interface.

The improved instrument panel and floor console with the pivotable instrument panel central stack modular structure is complemented by the adjustable shifter face plate assembly 110, also to accommodate floor build variations in vehicle assembly. In general and with reference to FIG. 1, the adjustable shifter face plate assembly 110 includes a shifter rod 112, a shifter rod base 152 including a shifter rod support 114, a top plate 116, an intermediary plate 118 between the shifter rod support 114 and the top plate 116, and eccentric cone 120 which is positionable on the shifter rod to align the shifter rod aesthetically with respect to the slot in the top plate through which the shifter rod projects.

Figure 2:
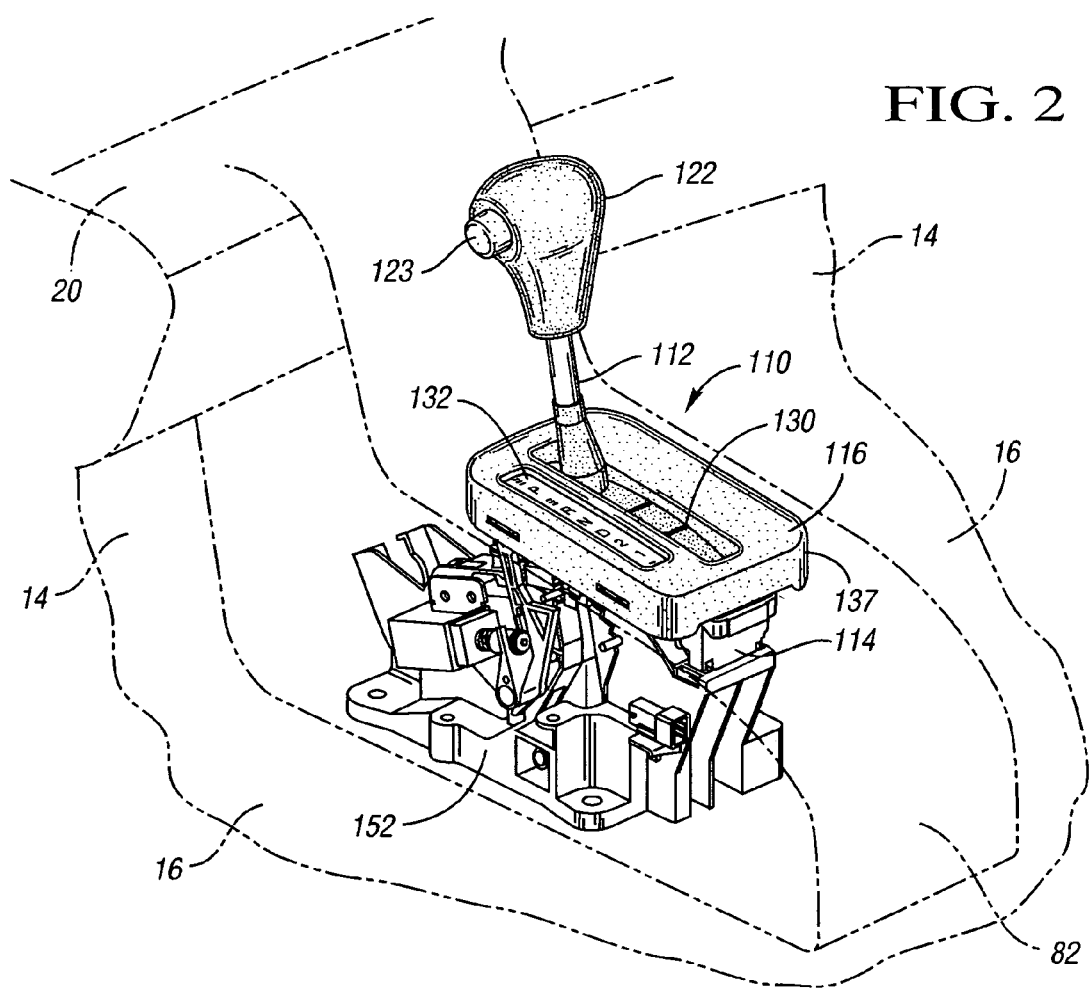
FIG. 2 is a perspective view of an assembled shifter face plate assembly shown in FIG. 1 and oriented with respect to an instrument panel and floor console in phantom.
Figure 3:
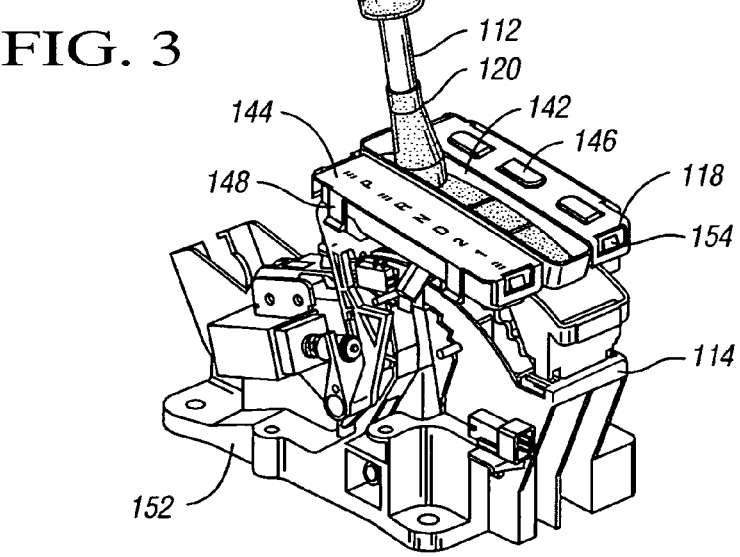
FIG. 3 is a perspective view of the shifter face plate assembly with the longitudinally shiftable top plate removed to expose the face of the transversely shiftable intermediary plate.
Figure 4:
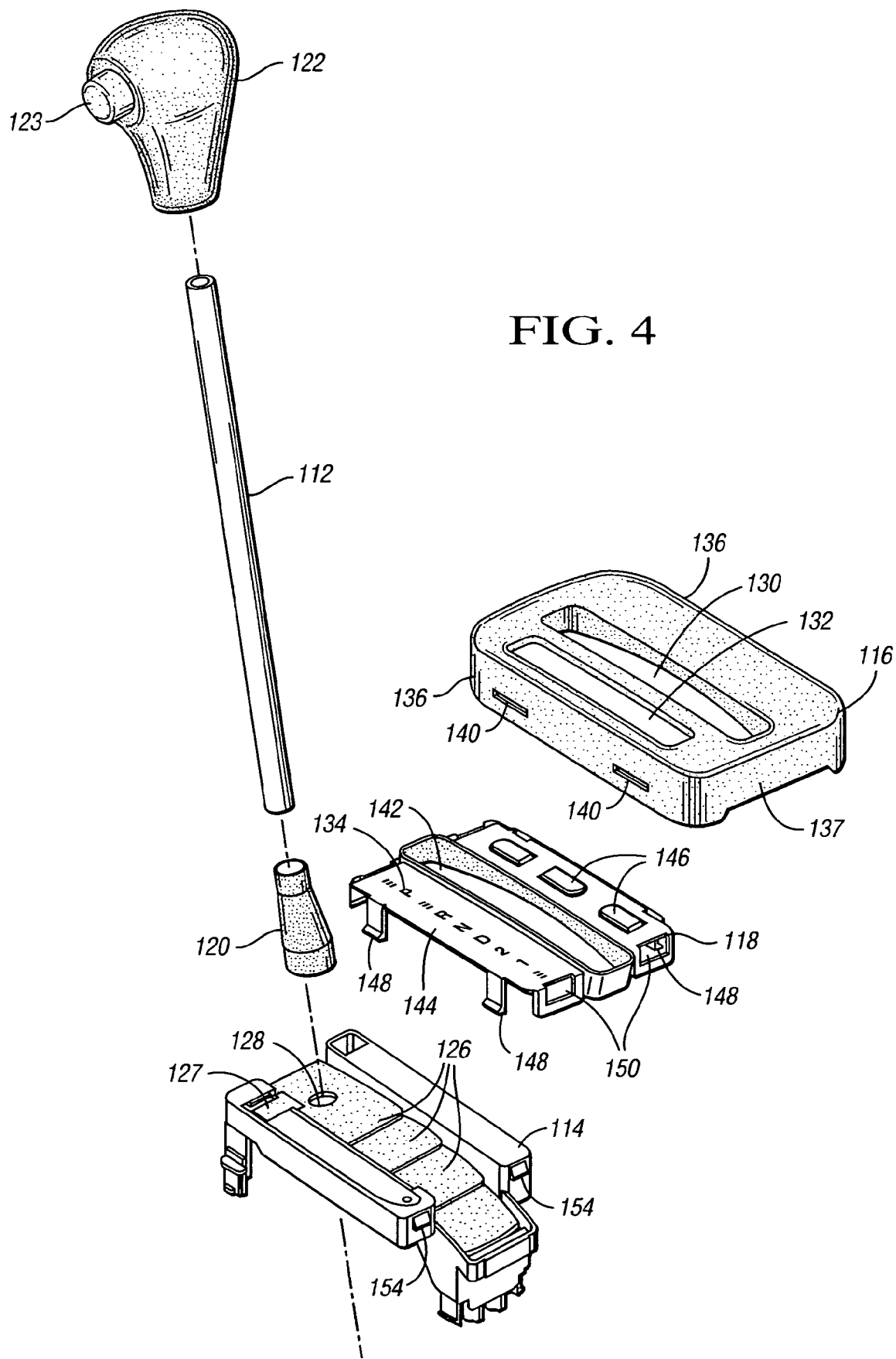
FIG. 4 is an exploded fragmentary perspective of the shifter face plate assembly shown in FIG. 2.

The shifter plate assembly 110 will now be described with particular reference to FIGS. 2, 3 and 4. The main parts are exploded in FIG. 4 and include the shifter rod 112, the shift rod support 114 on a shifter base 152, the top plate 116 and the intermediary plate 118. The top of the shifter rod 112 carries a handgrip 122 with a push button 123 to release the shifter rod for longitudinal movement when shifting the transmission (not shown). The eccentric cone 120 is axially shiftable and relatively rotatable on the shifter rod 112 for reasons to be described hereinafter. The shifter rod support 114 includes a plurality of masking plates 126 which slide with respect to one another to hide the transmission shifting mechanism therebelow. A transluscent indexing tab 127 underlays an indicia portion 144 of the intermediary plate 118 and moves with the shifter rod 112. Shifter rod 112 projects through a hole 128 in one of the plates 126.

The top plate 116 has a first longitudinal slot 130 through which the shifter rod 112 projects, and a second longitudinal window 132 for viewing the shift indicia 134 on the intermediary plate 118 therebelow. Both sides 136 of the peripheral skirt 137 of the top plate 116 carry a pair of longitudinal adjustment slots 140. The girth or peripheral skirt 137 of the top plate is configured to fit aesthetically within the girth of the floor console opening 111.

The intermediary plate 118 has a central slot 142 through which the shifter rod projects and which is alignable with the longitudinal slot 130 on the top plate. The intermediary plate has the indicia portion 144 carrying the shift markings or indicia PRNDL 134 or equivalent. Anti-rattle tabs 146 are positioned on the underside of top plate 116 to quiet any potential rattling noise in the shifter assembly. The intermediary plate also has a pair of guide tabs 148 on each side which interfit with the slots 140 in the top plate 116. Tabs 148 permit limited but sufficient longitudinal movement of the top plate with respect to the intermediary plate so that the plates 116, 118 can be adjusted longitudinally with respect to each other so that the top plate is aligned longitudinally to fit aesthetically within the console opening 111. A pair of end slots 150 on each end of the intermediary plate provide for transverse adjustment of the intermediary plate 118 with respect to the shifter rod support 114. This cooperates with the relative longitudinal movements of the plates so that the alignment of the top plate is completed with respect to the console opening both transversely and longitudinally.

The shifter rod support 114 is connected to the shifter base 152 which solidly bolts to the floor 16 of the vehicle. The console 82 also adjustably fastens to the vehicle floor with a bracket 88 and slots 90. The console encloses the shifter base 152. The shifter rod support 114 includes bosses 154 which extend through the oversize end slots 150 on the intermediary plate so that the intermediary plate 118 can float or shift horizontally transversely or laterally with respect to the shifter rod support 114, whereby also to align the shifter rod 112 with the slots 130 and 142 of the top and intermediary plates. Thus the transversely or laterally horizontal float of the intermediary plate 118 cooperates with the longitudinal horizontal float of the top plate with respect to the intermediary plate to move the shifter face plate assembly sufficiently that the skirt 137 of the top plate 116 fits within the opening 111 in the console 82. These cooperating respective movements move the girth or skirt of the top plate in a manner to accommodate and esthetically fit within the console opening so that a gap masking gasket is not needed.

Lastly, the eccentric cone 120 is shifted axially along the shifter rod until the cone resides generally within the slots 130, 142 of the top plate and intermediary plate, respectively. Then the cone is rotated to accommodate any offset of the shifter rod relative to the center plane of the top plate slot 130.

While the best modes for carrying out the invention have been described in detail, those familiar with the art to which this invention relates will recognize various alternative designs and embodiments for practicing the invention within the scope of the appended claims.

The invention claimed is:

1. An automatic shifter face plate assembly for a shift rod projectable through an opening in a floor console for a vehicle, said assembly comprising:
   a top plate having a first slot through which the shifter rod is projectable; and
   an intermediary plate supporting said top plate; said top plate being horizontally floatable with said intermediary plate laterally and horizontally floatable longitudinally with respect to said intermediary plate to align the top plate with the opening in the floor console; and
   an eccentric cone relatively slidable and rotatably supported on the shifter rod to accommodate the shifter rod in the top plate slot.

2. An adjustable instrument panel arrangement for accommodating the build variations of a vehicle floor comprising:
   a fixed panel portion extendable transversely between the sides of the vehicle;
   a pivotable portion adapted to contain a vehicle option and including a floor console pivotable with respect to said fixed panel portion and adjustably suspendable from said fixed panel portion to the vehicle floor;
   said floor console having a console opening and extendable rearwardly longitudinally along the vehicle floor when the pivotable portion is adjustably suspended at the vehicle floor, and further comprising:
   an automatic shifter face plate assembly for a shifter rod projectable through the floor console opening, said face plate assembly including a top plate having a first opening through which the shifter rod is projectable; and
   an intermediary plate supporting said top plate and being laterally shiftable with respect to the floor console to align the top plate with said console opening in one manner, and said top plate being longitudinally shiftable with respect to said intermediary plate to align said top plate with said console opening in another manner; and
   an eccentric cone relatively slidably and rotatably supported on the shifter rod to accommodate the shifter rod in said first opening of the top plate after the intermediary plate has been laterally shifted with respect to said floor console.

3. A shifter face plate assembly for a shifter rod and a shifter rod support in a floor console having a console opening comprising:
   a top plate through which the shifter rod projects and having a window; and
   an intermediary plate supporting the top plate;
   said top plate being shiftable longitudinally with respect to the intermediary plate and shiftable laterally with said intermediary plate to position the top plate aesthetically within the console opening; and
   the shifter rod and an eccentric cone relatively slidable and rotatable on the shifter rod.

4. The shifter plate assembly of claim 3 including an anti-rattle tab biasingly extending between the top plate and the intermediary plate to resist relative movement between the plates.

5. The shifter face plate assembly of claim 3 wherein shiftable longitudinally includes an adjustment slot on one of said top plate and said intermediary plate and a guide tab on the other of said top plate and said intermediary plate.

6. A shifter face plate assembly for a shifter rod and a shifter rod support in a floor console having a console opening comprising:

a top plate through which the shifter rod projects and having a window; and an intermediary supporting the top plate;

said top plate being shiftable longitudinally with respect to the intermediary plate and shiftable laterally with said intermediary plate to position the top plate aesthetically within the console opening;

wherein shiftable laterally includes an adjustment slot on one of said intermediary plate and the shifter rod support and a boss on the other of said intermediary plate and the shifter rod support.

7. A method of adjusting a shifter face plate assembly having a top plate and an intermediary plate to the shifter rod base in the opening of a floor console on a vehicle floor subject to floor build variations comprising:

adjustably affixing the floor console and the shifter rod base to the vehicle floor;

relatively movably connecting the top plate to the intermediary plate;

installing the connected top plate and intermediary plate for movement with respect to the shifter rod base;

laterally moving the intermediary plate with respect to the shifter rod base to align the top plate laterally with respect to the opening in the floor console; and longitudinally moving the top plate with respect to the intermediary plate to align the top plate longitudinally with respect to the opening in the floor console.

* * * * *